Sept. 23, 1952 W. J. PREISING ET AL 2,611,303
DRAFT GEAR
Filed July 7, 1948 2 SHEETS—SHEET 1

INVENTORS
WILLIAM J. PREISING
ROBERT E. STUTZKE
BY
Arthur Robert
ATTORNEY

Sept. 23, 1952  W. J. PREISING ET AL  2,611,303
DRAFT GEAR

Filed July 7, 1948  2 SHEETS—SHEET 2

INVENTORS
WILLIAM J. PREISING
ROBERT E. STUTZKE
BY Arthur Robert
ATTORNEY

Patented Sept. 23, 1952

2,611,303

UNITED STATES PATENT OFFICE 2,611,303

DRAFT GEAR

William J. Preising, New Albany, Ind., and Robert E. Stutzke, Louisville, Ky., assignors, by mesne assignments, to Minneapolis-Moline Company, a corporation of Minnesota Application July 7, 1948, Serial No. 37,425

10 Claims. (Cl. 97—47)

This invention is an improvement on the draft gear described and claimed in Patent No. 2,358,281 issued September 12, 1944, to C. T. Ray. In the construction shown in said patent, a change in load will develop a force tending to straighten the joint between the draft bar and plow beam, so that the plow must turn in the soil and lift the overburden to assume a new elevation. This further increases the load on the plow so that if the plow encounters a resistance close to the stalling load of the tractor, the added force required to turn the plow upward to a higher level may be sufficient to stall the tractor. Also, in some instances, irregularities of the ground line may cause the plow to be brought completely out of the ground.

It is an object of the present invention to provide a draft gear for a plow which will maintain the plow at a uniform depth below the ground line.

A further object is the provision of a draft gear for a plow which will prevent the plow from coming out of the ground under extreme conditions of irregular terrain.

Still another object is the provision of a draft gear embodying an automatic adjustment for depth of the plow to compensate or counteract for variations in load conditions.

Still another object is the provision of a draft gear in which the actual application of draft to the plow is substantially coincident with the draft vector or line of draft.

Another object is the provision of a draft gear in which the actual application of draft to the plow is coincident with the draft vector, and in which the line of draft is vertically adjustable for different depths of furrows.

The present invention is applicable to a plow or other earth working tool which is connected to a tractor or other draft appliance by a draw bar pivotally connected at one end to the plow and having its other end connected to the tractor so as to be vertically adjustable relative to the ground line so that the draw bar thus can assume a position substantially coincident with the line of draft or draft vector. The invention includes an automatic adjustment or guide at the pivotal connection of the draw bar to the tractor whereby the elevation of this pivotal connection relative to the ground line automatically increases with an increase in load on the plow to raise the draft vector without turning the plow, and thus, as the plow advances, decrease the depth of the plow cut or furrow so as to avoid development of an excessive or stalling load on the tractor or other draft appliance used to pull the plow.

The draft gear comprises an elevating lever carried by the tractor and a draw bar secured thereto at one end and pivoted to the earth working tool at the other end, the elevating lever being biased by resilient means acting in opposition to the draw bar pull to vary the elevation of the connection between the draw bar and elevating bar. The elevating lever is mounted on the tractor preferably in such manner that the connection between the elevating lever and draw bar can be adjusted upward or downward to set the depth of the earth working tool, preferably without changing the bias of the resilient means. Thus, by initially setting the connection at a predetermined elevation and resilient means at a predetermined bias, the earth working tool will be controlled to operate normally at a fixed depth of cut, but in the event the load becomes excessive, the bias will be overcome to raise the tool sufficiently so that the load does not exceed the stalling load on the tractor. If desired, limiting means may be provided to prevent the earth working tool being raised enough to come out of the ground.

In the preferred embodiment of the invention the elevating lever and draw bar are pivotally connected at an acute angle, and the resilient means tends to maintain this angle of connection, so that variations in load shift the angular relation to raise or lower the elevation of the pivotal connection against the resilient bias applied to the elevating lever. By disposing the elevating lever at an acute angle to the draw bar, only a small component of the load is exerted to shift the pivot point, and a realtively small spring may be employed to resist changes in elevation of the pivotal connection between the elevating lever and draw bar. The limit for the automatic adjustment prevents compensating counteraction going so far as to completely withdraw the plow from the ground under extreme load conditions. It also limits the decrease in depth of the tool to about one inch, which is sufficient in most cases, to prevent stalling of the tractor. Although this may result in stalling of the tractor in comparatively rare instances, it eliminates the occurrence of unplowed patches. Thus, for example, the limit may provide for a difference in furrow depth of about one inch between the predetermined and extreme load conditions.

The entire automatic adjustment is preferably mounted on the tractor so that the pivotal connection of the draft bar to the tractor may be raised or lowered, thus shifting the line of draft without changing the angle of draft relative to the ground line. This enables the plow to be set to operate at the predetermined or desired depth. The limit for the automatic adjustment will operate in the same way regardless of the depth for which the plow is set.

The invention is particularly applicable to self-leveling plows in which the angle of draft is constant and is independent of the depth of the furrow. In the operation of the invention as applied to a tractor, if the tractor goes over a rise in the ground, the pivotal connection of the draft bar to the tractor tends to raise the plow. A similar adjustment occurs when the tractor goes over a depression in the ground, so that the plow normally works at a substantially uniform or constant depth below the ground line.

The invention will be described in greater detail in connection with the accompanying drawing wherein is illustrated a preferred embodiment of the invention by way of example, and wherein:

Figure 3 is a side elevation of the draft gear on an enlarged scale;

Figure 4 is a section taken on line 4—4 of Figure 3 and shows a detail;

Figure 5 is an end view of a detail as viewed from the left of Figure 3, with parts in section; and Figure 6 is an diagrammatic view illustrating the opeartion of the invention.

Figure 1:
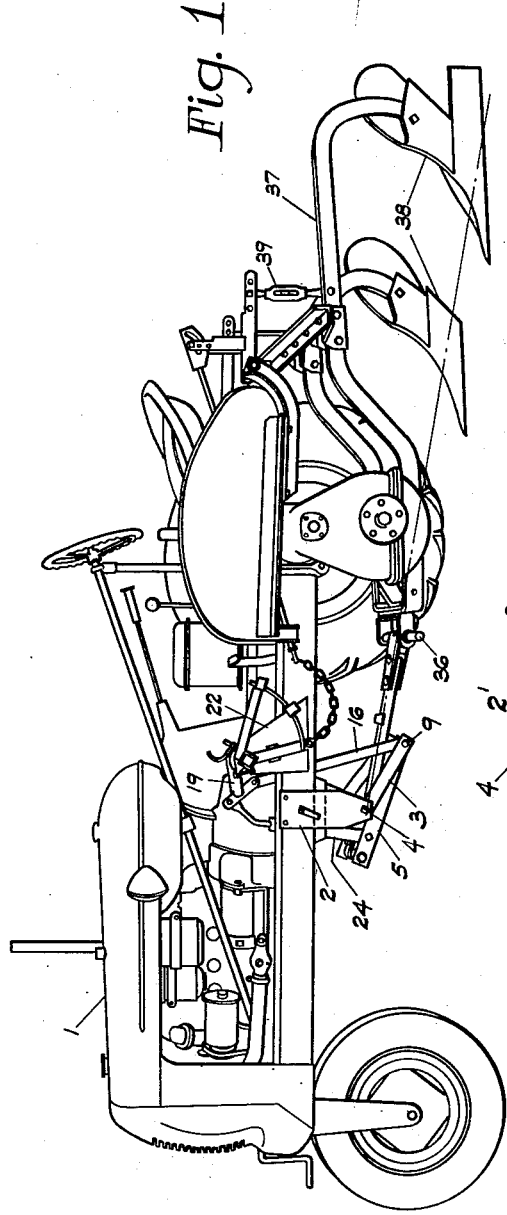
Figure 1 is a perspective view illustrating the invention applied to a tractor, one wheel of the tractor being removed to better show the invention.
Figure 2:
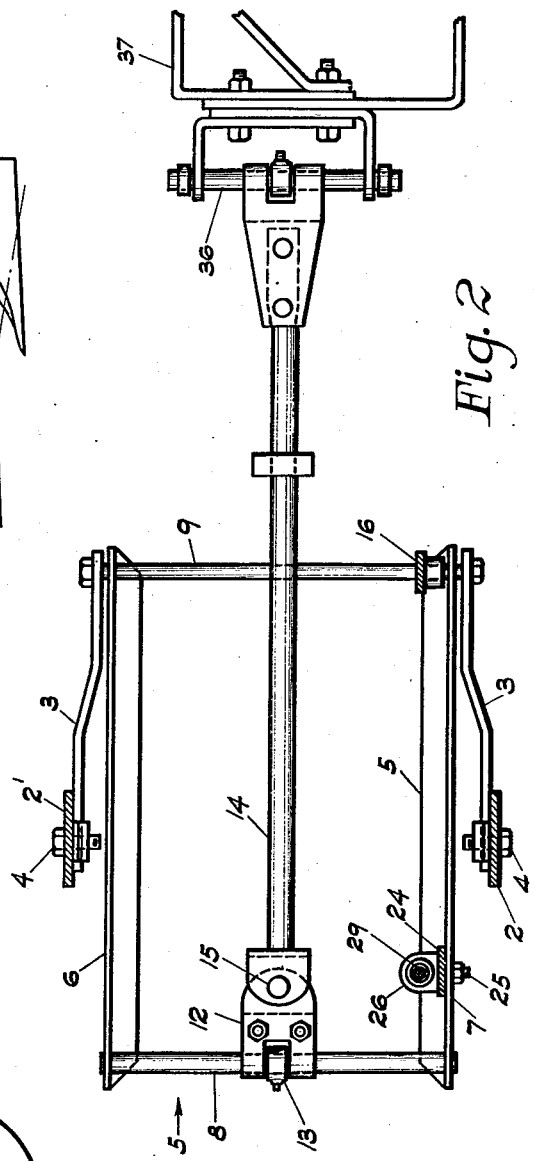
Figure 2 is a sectional view of the draft gear on an enlarged scale taken on line 2—2 of Figure 3.

Referring to the drawing, there is shown a tractor designated generally by the numeral 1. Side plates or brackets 2, 2' are rigidly secured on the frame or chassis intermediate the wheels and links 3 are carried thereon by pivots 4. An elevating lever, indicated generally at 5, is made up of angle bars 6 and 7 secured together by cross bars 8 and 9 which may be welded thereto to provide a rigid structure, and the lower end of the lever 5 is pivotally supported by the links 3 swivelled on the ends of cross bar 9. The cross bar 8 pivotally carries a cross head 12 held against longitudinal movement along the cross bar by an adjustable collar 13, and a draft or draw bar 14 is pivoted to the cross head at 15. The draw bar 14 and elevating bar 5 may together be regarded as an articulate member, one end of which is pivoted at 36 to the plow, and the other end of which is pivoted at 9 to the tractor. A bracing bar 16 is pivoted to the other cross bar 9 and at its upper end is swivelled at 17 (Figure 3) to one end of a pair of links 18 rigidly joined to a yoke 19 which in turn is connected to square shaft 21 in any suitable manner. As shown, the yoke 19 comprises an inverted channel bar welded to links 18 at one end, notched at 19a to receive the square shaft 21, and skewed at its end 19b to form a fork. An angle clamp bar 20 swivelled in the yoke 19 between the walls of the channel extends between the skewed ends or fork 19b of the yoke and is locked in position by a hand nut 19c engaging the skewed end to hold the yoke 19 rigidly on the shaft. Shaft 21 is journalled in plates 22 mounted on the tractor chassis, and the shaft may be rotated, after release thereof, manually or by the application of hydraulic power developed by a suitable hydraulic attachment known in the art.

A bar 24 pivoted to the elevating lever 5 at 25, has projecting abutments 26 and 27 welded thereto and has a turned over end 28 through which passes a guide bar 29 in slideable relation. The bent upper end of guide bar 29 is pivoted at 31 to the links 18. A spring 32 is maintained under predetermined initial compression on the guide bar 29 between lower abutment 26 and a collar 33 welded on the guide bar 29 below abutment 27. Collar 33 engages the lower face of abutment 27. Upward movement of the left end of elevating frame or lever 5, as viewed in Figure 3, causes lower abutment 26 to compress spring 32, and the upward movement of the elevating frame is limited by engagement of abutment 27 on bar 24 with sleeve 35, welded on rod 29. The left end of the elevating frame is prevented from moving downwardly by engagement of abutment 27 on bar 24 against the collar 33 on the guide bar 29. The draw bar 14 is swivelled at 36 to the beam 37 of a plow 38 of any suitable type, and the plow is raised to inoperative position, or lowered to operative position, by a link 39 connected to the beam and controlled by the hydraulic mechanism of the tractor.

The operation of the invention now will be described. The pivot 9 of the elevating lever 5 is held at a fixed position by the bar 16, links 3 and brackets 2, as the pivot points 4, 9 and 17 form a rigid triangle. Rod 29 is held in fixed position by links 18 and yoke 19. The pivot 8, to which is connected the draw bar 14, floats on spring 32, because bar 24 on elevating frame 5 is held in its lowermost position by the engagement of spring 32 between abutment 26 thereon and the abutment 33 on rod 29. Draw bar 14 forms an acute angle with the elevating lever 5 and the draw bar passes over the pivotal support 9 of the elevating lever on the tractor. Assuming that the plow exerts a constant rearward pull through draft bar 14 at the pivot 8, this pull tends to rotate elevating frame 5 clockwise about its fixed pivot 9 to raise the pivotal connection 8 of the draft bar therewith to a different elevation. This tendency, however, is resisted by spring 32 which is under an initial predetermined compression. That is, clockwise pivotal movement of elevating frame 5 about pivot 9 raises bar 24, thus shifting the lower abutment 26 upwardly to compress the spring 32 which increasingly resists such movement.

In the type of plow illustrated the depth of furrow cut by the plow share depends on the elevation of the coupling point 36 above the soil, and under balanced operating conditions the draw bar 14, assumes a position coincident with the draft vector or line of draft indicated by dot and dash lines in Figures 1 and 3. The load or drag on the tractor is generally proportional to the depth of cut, and varies with the nature of the soil. For example, when the plow, operating at a given depth, encounters harder soil the drag or load increases, thus turning elevating lever 5 upward about its pivot 9 against the resistance of spring 32 until pivot 8 reaches an elevation where the upward component of the load is balanced by the spring. In this new position of draft bar 14 an upward pull is exerted on coupling point 36 and the plow is constrained to rise as it advances to elevate this coupling point. As the coupling point and plow raise the load the draw bar pull decreases and allows pivot point 8 to lower until a position of balance is reached where the vertical component of draw bar pull is balanced by the spring. In this position the draw bar again coincides with the line of draft so that the knuckle joint 36 lies on the line of draft.

The principle of operation may be made clearer by references to the diagram shown in Figure 6. For a given depth of furrow, the line of draft is the line A. When the drag on the tractor increases the pivot 8 rises about the pivot point 9 to the position 8''. The draft bar thus assumes the position 14'' as the tractor moves forward and exerts an upward and forward pull on the plow. As the upward pull raises the point 36 to the position 36' the point 8'' settles back to a position 8' where a new line of draft A' parallel to the old line of draft is established, and the plow assumes a higher level corresponding to the new draft line.

The plow may be set for any desired depth of furrow by rotating shaft 21. Rotation of shaft 21 counterclockwise lowers rod 16 and pivot 9, and also lowers guide rod 29 and pivot 8. However, the compression of spring 32 is not directly affected by this adjustment, but responds only to the change in load on the tractor. The elevation of pivot 8 determines the depth of furrow because the lines of draft for the different depths of furrows are parallel and the point 36 will adjust its elevation to lie in the line of draft.

We prefer to limit the upward movement of pivot 8 to prevent the plow coming to the surface. In practice, we have found a limitation of about one inch to be sufficient. Thus, the elevating lever 5 and bar 24 can rise until the upper abutment 27 engages the lower edge of sleeve 35 to thus limit upward movement of pivot 8. However, if desired, abutment 26 may be made adjustable to change the bias of spring 32.

In the construction illustrated, a change in load can change the direction or angle of draw bar pull without actually raising the plow, and as the tractor moves forward the plow is constrained to cut upwardly through the soil burden to a higher level to relieve the load. The plow thus becomes immediately responsive to a change in angle of elevation of the draw bar pull. The angle of elevation of the draw bar pull is responsive to the load on the plow, and is also responsive to changes in terrain. Thus, the raising or depressing of the tractor as the wheels go over a rise or depression in the soil surface, changes the elevation of pivot 8 and causes the plow to seek a corresponding depth of cut. Thus the depth of cut is maintained uniform under uneven terrain and constant load.

We claim as our invention:

1. The combination comprising: a tractor; a pair of brackets rigidly secured to said tractor; an articulate member comprising a draft bar adapted to be connected at one end to an earth working tool and an elevating lever pivotally connected together; links connected between said brackets and an end of said elevating lever; a bar connected to said latter mentioned end of the elevating lever; resilient means engaging said elevating lever; and means for simultaneously adjusting the elevation of said resilient means and latter bar.

2. The combination comprising: a tractor; a pair of brackets rigidly secured to said tractor; an articulate member having one end adapted to be connected to an earth working tool; links connected to said brackets at one end and having their other ends connected to the other end of said articulate member; an upwardly extending bar connected to said latter end of the articulate member; resilient means engaging said articulate member; a link connecting said resilient means and said bar, and means connected to said last link for raising or lowering said articulate member.

3. The combination comprising: a tractor; a pair of brackets rigidly secured thereto; an elevating lever; a pair of links each being pivoted at one end to a bracket and to the other end to the rear end of said lever; a draft bar pivotally connected to the front end of the level; an adjustable bar connected to the rear end of the lever; adjustable resilient means engaging the forward end of said lever; and means for simultaneously elevating said adjustable bar and resilient means.

4. A draft gear for connecting an earth working tool to a tractor comprising: an elevating lever; means carried by the tractor for pivotally supporting one end of said lever; a draft bar pivotally secured at one end to the earth working tool and pivotally attached at its other end to said other end of the elevating lever to form an acute angle with said lever, with the draft bar at a higher elevation than said lever; and spring means resisting an increase in said acute angle, whereby an increase in the load of said tool to overcome said spring means will shift the draft vector of the tool upwardly.

5. A draft gear for connecting an earth working implement to a tractor comprising: an elevating lever carried by the tractor; means for adjustably pivotally supporting one end of said lever on said tractor; a draft bar pivotally secured at one end to the earth working implement and pivotally attached at its other end to the other end of the elevating lever to form an acute angle with the elevating lever, the draft bar passing over the pivotal support of the lever on the tractor; and spring means operative upon the elevating lever to resist an increase in said acute angle, whereby an increase in the load of said implement to overcome the resistance of said spring means will swing said elevating lever about its pivot support on the tractor to raise the pivotal connection of the elevating lever and draft bar and move the draft vector of the tool upwardly.

6. The combination comprising: a tractor; a pair of brackets rigidly secured to said tractor; an articulate member having one end adapted to be connected to an earth working tool; links connected to said brackets at one end and having their other ends connected to the other end of said articulate member; an upwardly extending bar connected to said latter end of the articulate member; resilient means engaging said articulate member; a link connecting said resilient means and said bar, means connected to said last link for raising or lowering said articulate member, and said last mentioned means including a yoke secured to the link and a rotatable shaft carrying the yoke.

7. A draft gear of the character described for connecting an earth working implement to a tractor and for controlling the working depth and penetration of said implement, comprising a forwardly and rearwardly extending lever pivoted at its rear end to the tractor for up and down swinging movements at its forward end, a forwardly and rearwardly extending draft bar connected at its rear end to the implement and extending forward therefrom and connected at its forwardly disposed end to the forward end of the lever at an elevation above the pivot between the lever and tractor so that the pull of the implement will swing the lever upward and thereby elevate the forward end of the draft bar, and spring means operatively arranged to bias the forward end of the lever in a downward direction and resist such upward movement of the forward end of the draft bar.

8. A draft gear of the character described for connecting an earth working implement to a tractor and for controlling the working depth and penetration of said implement, comprising a draft bar extending forwardly and rearwardly between tractor and implement and connected at its rear end to the implement, a lever having a pivot connection at one end to the forward end of the draft bar and extending rearwardly from that connection, means pivotally connecting the rear end of the lever to the tractor at an elevation below the forward end of the draft bar whereby the pull of the implement will swing the lever about its rear end and cause the pivot connection between the lever and draft bar to rise, a spring operatively connected between the lever and tractor to resist upward movement of the draft bar by the pull of the implement, and means for raising and lowering the lever as a whole with respect to the tractor.

9. A draft gear for connecting a tractor to an earth working implement of the type in which the line of draft regulates the penetration of the implement, comprising a forwardly and rearwardly extending draft bar and lever, means for connecting the rear end of the draft bar to the implement, means connecting the forward ends of the draft bar and lever together with the lever extending rearwardly, and means pivotally connecting the rear end of the lever to the tractor at an elevation with respect to the pivotally connected ends of the lever and draft bar such that the pull of the implement will tend to swing these connected ends upward and raise the line of draft to the implement.

10. A draft gear for connecting a tractor to an earth working implement of the type in which the line of draft regulates the penetration of the implement, comprising a forwardly and rearwardly extending draft bar and lever, means for connecting the rear end of the draft bar to the implement, means connecting the forward ends of the draft bar and lever together with the lever extending rearwardly, means pivotally connecting the rear end of the lever to the tractor at an elevation with respect to the pivotally connected ends of the lever and draft bar such that the pull of the implement will tend to swing these connected ends upward and raise the line of draft to the implement, spring means connected to the forward end of the lever to bias the same downward, and means including said spring means for raising and lowering the lever as a whole to adjust the line of draft to the implement.

WM. J. PREISING.
R. E. STUTZKE.

REFERENCES CITED

The following references are of record in the file of this patent:

UNITED STATES PATENTS

| Number | Name | Date |
|---|---|---|
| 1,501,652 | Ferguson | July 15, 1924 |
| 1,940,061 | Paul | Dec. 19, 1933 |
| 2,358,281 | Ray | Sept. 12, 1944 |
| 2,358,282 | Ray | Sept. 12, 1944 |
| 2,368,631 | Blalock | Feb. 6, 1945 |
| 2,436,155 | Silver | Feb. 17, 1948 |

FOREIGN PATENTS

| Number | Country | Date |
|---|---|---|
| 100,793 | Great Britain | Oct. 26, 1916 |